US010622658B2

(12) United States Patent
Onomichi et al.

(10) Patent No.: US 10,622,658 B2
(45) Date of Patent: Apr. 14, 2020

(54) RELEASE FILM, LAMINATE AND METHOD FOR MANUFACTURING SAME, AND METHOD FOR MANUFACTURING FUEL CELL

(71) Applicants: DAICEL CORPORATION, Osaka-shi, Osaka (JP); DAICEL VALUE COATING LTD., Tokyo (JP)

(72) Inventors: Hiroshi Onomichi, Amagasaki (JP); Katsuhiko Sumita, Himeji (JP); Yoshimichi Okano, Himeji (JP); Kanae Nishimura, Amagasaki (JP); Kazuyuki Okada, Amagasaki (JP); Takayuki Yaegashi, Himeji (JP); Ken Suzuki, Fuji (JP)

(73) Assignees: DAICEL CORPORATION, Osaka-Shi (JP); DAICEL VALUE COATING LTD., Tokyo (JP)

( * ) Notice: Subject to any disclaimer, the term of this patent is extended or adjusted under 35 U.S.C. 154(b) by 463 days.

(21) Appl. No.: 15/033,302

(22) PCT Filed: Nov. 4, 2014

(86) PCT No.: PCT/JP2014/079256
§ 371 (c)(1),
(2) Date: Apr. 29, 2016

(87) PCT Pub. No.: WO2015/072372
PCT Pub. Date: May 21, 2015

(65) Prior Publication Data
US 2016/0276689 A1 Sep. 22, 2016

(30) Foreign Application Priority Data

Nov. 14, 2013 (JP) .................. 2013-235988
Sep. 18, 2014 (JP) .................. 2014-190098

(51) Int. Cl.
| *H01M 8/1086* | (2016.01) |
| *B29C 33/68* | (2006.01) |
| *H01M 8/1069* | (2016.01) |
| *H01M 4/88* | (2006.01) |
| *C08J 7/04* | (2020.01) |
| *C08F 232/08* | (2006.01) |
| *C08J 5/22* | (2006.01) |
| *H01M 8/1004* | (2016.01) |
| *H01M 8/1018* | (2016.01) |

(52) U.S. Cl.
CPC ........... *H01M 8/1093* (2013.01); *B29C 33/68* (2013.01); *C08F 232/08* (2013.01); *C08J 5/2275* (2013.01); *C08J 7/042* (2013.01); *C08J 7/0427* (2020.01); *H01M 4/8814* (2013.01); *H01M 8/1004* (2013.01); *H01M 8/1069* (2013.01); *C08J 2300/12* (2013.01); *C08J 2367/00* (2013.01); *C08J 2427/18* (2013.01); *C08J 2427/22* (2013.01); *C08J 2445/00* (2013.01); *H01M 4/881* (2013.01); *H01M 2008/1095* (2013.01); *Y02P 70/56* (2015.11)

(58) Field of Classification Search
CPC ... B29C 33/68; C08J 2445/00; C08J 2367/00; C08J 2300/12; C08J 7/047; C08J 5/2275; C08J 5/22; C08J 2427/22; C08J 7/042; C08J 2427/18; C08F 232/08; H01M 8/1093; H01M 8/1069; H01M 4/881; H01M 4/8814; H01M 2008/1095; H01M 8/1004; Y02P 70/56
USPC ........................................................ 429/535
See application file for complete search history.

(56) References Cited

U.S. PATENT DOCUMENTS

2009/0075133 A1* 3/2009 Song ................... H01M 8/0239
429/481
2009/0124769 A1 5/2009 Nishii et al.
(Continued)

FOREIGN PATENT DOCUMENTS

| EP | 0 997 482 A1 | 5/2000 |
| JP | 2007-119660 A | 5/2007 |
| JP | 2009-298999 A | 12/2009 |

(Continued)

OTHER PUBLICATIONS

Extended European Search Report dated Apr. 26, 2017, in European Patent Application No. 14861826.7.
(Continued)

Primary Examiner — Jonathan G Jelsma
Assistant Examiner — Omar M Kekia
(74) Attorney, Agent, or Firm — Birch, Stewart, Kolasch & Birch, LLP

(57) ABSTRACT

A release layer of a release film for producing a membrane electrode assembly of a polymer electrolyte fuel cell comprises a cyclic olefin polymer comprising an olefin unit having a $C_{3-10}$alkyl group as a side chain thereof. The release layer may have a glass transition temperature of about 210 to 350° C. The release layer may have a transition point of a dynamic storage modulus E' in a range from −50 to 100° C. An ion exchange layer comprising an ion exchange polymer may be laminated on the release layer of the release film by a roll-to-roll processing to produce a laminate. The release film may be separated from the laminate to give the membrane electrode assembly. The release film achieves improved production of a membrane electrode assembly (an electrolyte membrane and/or an electrode membrane) of a polymer electrolyte fuel cell.

13 Claims, No Drawings

(56) References Cited

U.S. PATENT DOCUMENTS

2012/0021335 A1* 1/2012 Sugioka .................. B32B 7/06
429/492
2014/0044950 A1 2/2014 Umemoto et al.

FOREIGN PATENT DOCUMENTS

| JP | 2010-80169 A | 4/2010 |
|----|----|----|
| JP | 2010-234570 A | 10/2010 |
| JP | 5017222 B2 | 9/2012 |
| JP | 5155500 B2 | 12/2012 |
| JP | 2014-154273 A | 8/2014 |
| WO | WO 2012/132150 A1 | 10/2012 |

OTHER PUBLICATIONS

International Search Report, issued in PCT/JP2014/079256, PCT/ISA/210, dated Feb. 10, 2015.
Written Opinion of the International Searching Authority, issued in PCT/JP2014/079256, PCT/ISA/237, dated Feb. 10, 2015.
International Preliminary Report on Patentability and English translation of Written Opinion of the International Searching Authority dated May 17, 2016, in PCT International Application No. PCT/JP2014/079256.

\* cited by examiner

RELEASE FILM, LAMINATE AND METHOD FOR MANUFACTURING SAME, AND METHOD FOR MANUFACTURING FUEL CELL

TECHNICAL FIELD

The present invention relates to a release film for use in producing (forming) a membrane electrode assembly that is a member composing a polymer electrolyte fuel cell, a laminate (laminated film) containing the release film and a process for producing the same, and a process for producing the membrane electrode assembly using the release film.

BACKGROUND ART

Polymer electrolyte fuel cells (or solid polymer fuel cells) have a basic component called a membrane electrode assembly (MEA). The MEA is obtainable by laminating an electrode membrane (a catalyst layer or an electrode catalyst membrane) on either side of a polymer electrolyte membrane and putting the resulting laminate between a fuel gas supply layer and an air supply layer; the electrode membrane contains, as a main component, a platinum group metal catalyst supported on a carbon powder, the polymer electrolyte membrane is an ion exchange membrane, and the fuel gas supply layer and the air supply layer are an electroconductive porous membrane. For the MEA, both electrolyte membrane and electrode membrane contain an ion exchange polymer. The electrolyte membrane and the electrode membrane are usually formed by a casting method and/or a coating method. A method of laminating the electrolyte membrane and the electrode membrane usually comprises allowing an electrolyte membrane formed on a support to closely contact with an electrode membrane formed on a support, thermocompression bonding these membranes at about 130 to 150° C. (about 150 to 200° C. according to a material used) and a pressure of about 1 to 10 MPa, and then separating the supports from these membranes. Thus, as the support, a release film is used. The release film requires a moderate (or reasonable) peelability from the electrolyte membrane and the electrode membrane and a moderate (or reasonable) adhesion to the electrolyte membrane and the electrode membrane. The ion exchange polymer contained in the electrolyte membrane and the electrode membrane has a unique structure that has a main chain being a highly releasable fluoropolymer and a side chain containing a poorly releasable sulfonic acid group. This makes it difficult to predict the peelability behavior and to balance the peelability and the adhesion. The release film for the production of a fuel cell further requires heat resistance for reasons of production process. The release film, which is produced by a roll-to-roll processing in terms of efficient production, also requires flexibility. As the release film, a fluorine-containing film is widely used. The fluorine-containing film has excellent heat resistance, releasability, and stain resistance, while the film is expensive and less combustible in waste incineration after use, and easily generates a poisonous gas. The film, which has a low elastic modulus, is difficult to produce by a roll-to-roll processing. In place of the fluorine-containing film, a release film containing a cyclic olefin polymer is also reported.

Japanese Patent Application Laid-Open Publication No. 2010-234570 (JP-2010-234570A, Patent Document 1) discloses a release film made of a cycloolefin copolymer and also describes a release film formed by coating a solution of a cycloolefin copolymer on a substrate film such as a poly(ethylene terephthalate) film. This document discloses that the cycloolefin copolymer has a glass transition temperature of usually not lower than 50° C. and most preferably not lower than 160° C. and that a common cycloolefin copolymer has an upper limit of Tg of about 250° C. In working examples of the document, a solution containing a copolymer of ethylene and norbornene is cast on a poly(ethylene terephthalate) film using a flow-casting apparatus to form a release film having a thickness of 0.5 μm.

Unfortunately, this release film, which has a low heat resistance, a peelability insufficient for a high-temperature production process, and an insufficient toughness, easily cracks or fractures when being produced by a roll-to-roll processing.

Japanese Patent No. 5017222 (JP-5017222B, Patent Document 2) describes a copolymer for forming a polarizing film for a liquid crystal display; the copolymer comprises (A) 10 to 69% by mol of a structural unit derived from propylene, (B) 1 to 50% by mol of a structural unit derived from a $C_{6-12}$ α-olefin, and (C) 30 to 89% by mol of a structural unit derived from norbornene, and has a weight-average molecular weight of 50,000 to 1,000,000. This document discloses that the copolymer has a glass transition temperature of 50 to 250° C. (particularly, 80 to 200° C.). In working examples of the document, a copolymer having a glass transition temperature of 92 to 168° C. is prepared.

The document discloses neither a fuel cell nor a release film. If the film is used as a release film for producing a fuel cell, the film would be unsuitable due to an insufficient heat resistance thereof.

Japanese Patent Application Laid-Open Publication 2009-298999 (JP-2009-298999A, Patent Document 3) describes an optical film of a cyclic olefin addition copolymer obtainable from a cyclic olefin (A) monomer unit and an α-olefin (B) monomer unit having 5 or more carbon atoms; the proportion of the structural unit (A) and that of the structural unit (B) are 80 to 99% by mol and 1 to 20% by mol, respectively, in 100% by mol of the total amount of the structural units (A) and (B). This document discloses that the cyclic olefin addition copolymer has an excellent heat resistance, a high transparency, a low water absorbency, an excellent moldability, an excellent toughness, and a low coefficient of linear expansion and describes that the copolymer is suitable for an optical substrate for a display, or other applications. The document discloses that the cyclic olefin addition copolymer has a glass transition temperature of 200 to 400° C. (particularly, 245 to 300° C.). In working examples of the document, a copolymer having a glass transition temperature of 245 to 262° C. is prepared.

This document also fails to describe a fuel cell. The document discloses a release film just as an example of electric insulating members. The document has no description about releasability as a purpose or an advantage or about releasability evaluation. If the film is used as a release film for producing a fuel cell, the film would be unsuitable for an application that requires a high heat resistance.

CITATION LIST

Patent Literature

Patent Document 1: JP-2010-234570A (Claims, paragraphs [0024] [0025], and Example 2)
Patent Document 2: JP-5017222B (Claims, paragraph [0030], and Examples)

Patent Document 3: JP-2009-298999A (Claims, paragraphs [0019] [0028] [0044], and Examples)

SUMMARY OF INVENTION

Technical Problem

It is therefore an object of the present invention to provide a release film that achieves efficient production of a membrane electrode assembly (an electrolyte membrane and/or an electrode membrane) of a polymer electrolyte fuel cell; and to provide a laminated film containing the release film, a process for producing the laminated film, and a process for producing the membrane electrode assembly using the release film.

Another object of the present invention is to provide a release film, a laminated film containing the release film, a process for producing the laminated film, and a process for producing the membrane electrode assembly using the release film; the release film has a moderate peelability from an electrolyte membrane and an electrode membrane, a moderate adhesion to the electrolyte membrane and the electrode membrane, a high heat resistance, and a high toughness and thus enables the membrane electrode assembly to be produced efficiently by a heat treatment with a roll-to-roll processing.

It is still another object of the present invention to provide a release film, a laminated film containing the release film, a process for producing the laminated film, and a process for producing the membrane electrode assembly using the release film; the release film is easily produced by coating a material having an excellent solubility in a solvent.

Solution to Problem

The inventors of the present invention noted that the release film described in Patent Document 1 had an insufficient heat resistance, and first studied the adjustment of the glass transition temperature of the ethylene-norbornene copolymer described in Patent Document 1 to achieve the above-mentioned objects. For the ethylene-norbornene copolymer, an increased norbornene content of the copolymer raised the glass transition temperature. This improved the peelability of a release film composed of such a copolymer at a high temperature, while the release film was damaged (cracked or fractured) probably due to a low toughness thereof. Thus use of the release film failed to efficiently produce a membrane electrode assembly (MEA) of a polymer electrolyte fuel cell by a roll-to-roll processing. When the ethylene-norbornene copolymer had a glass transition temperature rising above a given temperature, the copolymer had a low solubility in a solvent. This made it difficult to produce the film by coating. The inventors of the present invention made intensive studies to achieve the above objects and finally found that the MEA is efficiently producible using a release film which has a release layer containing a cyclic olefin polymer containing an olefin unit having a $C_{3-10}$alkyl group as a side chain thereof. The present invention was accomplished based on the above findings.

That is, an aspect of the present invention provides a release film for producing a membrane electrode assembly of a polymer electrolyte fuel cell; the release film comprises a release layer, the release layer comprises a cyclic olefin (or cycloolefin) polymer comprising an olefin unit, and the olefin unit has a $C_{3-10}$alkyl group as a side chain thereof. The release layer may have a glass transition temperature of about 210 to 350° C. The release layer may have a transition point of a dynamic storage modulus E' in a range from −50 to 100° C. The cyclic olefin polymer may comprise, as a repeating unit, a chain olefin unit having a $C_{3-10}$alkyl group and/or a cyclic olefin unit having a $C_{3-10}$alkyl group. In particular, the cyclic olefin polymer may comprise a copolymer containing (A) a cyclic olefin unit free from a $C_{3-10}$alkyl group and (B) a chain or cyclic olefin unit having a $C_{3-10}$alkyl group. The cyclic olefin unit (B) may comprise an ethylene or norbornene unit having a straight-chain $C_{4-8}$alkyl group. The ratio (molar ratio) of the cyclic olefin unit (A) relative to the chain or cyclic olefin unit (B) may be about 50/50 to 99/1 in the former/the latter. The release layer may have an average thickness of about 0.2 to 5 μm. The release film of the present invention may further comprise a substrate layer; the release layer may be laminated on at least one side of the substrate layer, and the substrate layer may comprise at least one member selected from the group consisting of a polyolefin, a vinyl alcohol-series polymer, a polyester, a polyamide, and a cellulose derivative. In the release film of the present invention, the release layer may be formed by coating.

Another aspect of the present invention provides a laminate for producing a polymer electrolyte fuel cell; the laminate comprises the release film and an ion exchange layer laminated on the release layer of the release film, and the ion exchange layer comprises an ion exchange polymer. The ion exchange polymer may comprise a fluoropolymer containing a side chain having a sulfonic acid group. The ion exchange layer containing the ion exchange polymer may be an electrolyte membrane and/or an electrode membrane. The laminate of the present invention may be produced by a roll-to-roll processing.

A further aspect of the present invention provides a process for producing the laminate, comprising a step of laminating the ion exchange layer containing the ion exchange polymer on the release layer of the release film. In the laminating step, the lamination may be carried out by a roll-to-roll processing.

A still further aspect of the present invention provides a process for producing a membrane electrode assembly of a polymer electrolyte fuel cell, comprising a step of separating the release film from the laminate.

As used herein, the term "ion exchange layer" means a layer containing an ion exchange polymer. The ion exchange layer, which is not limited to an electrolyte membrane that is an ion exchange membrane, also includes an electrode membrane containing an ion exchange polymer and a catalyst.

Advantageous Effects of Invention

According to the present invention, the release film, which has a release layer containing a cyclic olefin polymer containing an olefin unit having a $C_{3-10}$alkyl group as a side chain thereof and is used for producing the MEA, achieves improved production of the MEA. In particular, the release film of the present invention, which has a moderate (or reasonable) elasticity, can be wound up onto a roller and thus is continuously producible by a roll-to-roll processing. If the release film is produced by a heat treatment with a roll-to-roll processing (for example, a heat treatment at a temperature of not lower than 140° C.), such a process prevents or reduces an unsuitable peelability or a breakage (such as fracture or crack) of the release layer, stably produces the release film, and improves in productivity. The cyclic olefin polymer, which has an excellent solubility in a solvent, enables the release film to be produced easily by coating.

DESCRIPTION OF EMBODIMENTS

[Release Film]

The release film of the present invention is a release film for producing a membrane electrode assembly (MEA) of a polymer electrolyte fuel cell. The release film has a release layer which comprises a cyclic olefin polymer comprising an olefin unit having a $C_{3-10}$alkyl group as a side chain thereof. In particular, the release film of the present invention may be used as follows: an electrolyte membrane and/or an electrode membrane, each containing an ion exchange polymer, is laminated on the release film(s) to produce an MEA from which the release film(s) is then separated.

(Release Layer)

The release layer of the present invention contains a cyclic olefin polymer. The cyclic olefin polymer contains an olefin unit having a $C_{3-10}$alkyl group as a side chain thereof, and has a predetermined viscoelasticity.

The release layer (cyclic olefin polymer) may have a glass transition temperature (Tg) selected from the range of about 210 to 350° C. In terms of well-balanced heat resistance and mechanical characteristics, the glass transition temperature may for example be about 220 to 350° C., preferably about 230 to 340° C. (e.g., about 250 to 320° C.), more preferably about 260 to 300° C. (particularly about 265 to 280° C.). For an application that requires a high heat resistance, the glass transition temperature may for example be about 270 to 350° C. and preferably about 280 to 340° C. (particularly about 300 to 335° C.). A release layer having an excessively low glass transition temperature easily has an unsuitable peelability due to a low heat resistance thereof. A release layer having an excessively high glass transition temperature is hard to produce. As used herein, the glass transition temperature can be measured by a differential scanning calorimeter (DSC).

The release layer preferably has a transition point of a dynamic storage modulus (or dynamic storage elastic modulus) E' in a temperature range (for example, about −50 to 100° C.) lower than the glass transition temperature when tested for the dynamic viscoelasticity in a temperature range from −50° C. to 250° C. under conditions of a heating rate of 5° C./minute and a frequency of 10 Hz. A release layer having no transition point has a low toughness. A release layer with an overlong side chain or an excessively high ratio of the unit having a side chain has a low glass transition temperature and a low heat resistance. The dynamic storage modulus can be measured by the method described in Examples, and can be evaluated based on that the dynamic loss tangent tan δ, which is a ratio of a dynamic storage modulus E' and a dynamic loss modulus E", has a maximum point in the above-mentioned test.

The cyclic olefin polymer having such characteristics contains an olefin unit having an alkyl group with 3 to 10 carbon atoms (a $C_{3-10}$alkyl group) as a side chain thereof. The $C_{3-10}$alkyl group, which is a side chain having a high degree of freedom with respect to a main chain of the cyclic olefin polymer, can probably transform energy generated by deformation into heat energy. This can maintain the elasticity and the toughness if the glass transition temperature of the cyclic olefin polymer is increased. Incidentally, an α-olefin having a terminal alkyl group with not less than 3 carbon atoms is a liquid at room temperature. According to the present invention, such an effect is shown in a case where the number of carbon atoms in the alkyl group of the side chain is not less than 3. In a case where the number of carbon atoms is beyond 10, the cyclic olefin polymer has an excessively low glass transition temperature.

The $C_{3-10}$alkyl group may include, for example, a straight- or branched chain alkyl group such as propyl group, isopropyl group, n-butyl group, isobutyl group, s-butyl group, t-butyl group, pentyl group, neopentyl group, hexyl group, heptyl group, octyl group, 2-ethylhexyl group, nonyl group, or decanyl group. These $C_{3-10}$alkyl groups may be used alone or in combination. Among them, in terms of well-balanced heat resistance, elasticity, and toughness, a straight-chain $C_{4-9}$alkyl group (e.g., n-butyl group, n-hexyl group, and n-octyl group) is preferred, and a straight-chain $C_{4-8}$alkyl group (particularly, a straight-chain $C_{5-7}$alkyl group such as n-hexyl group) is more preferred.

The cyclic olefin polymer may contain, as a repeating unit, a chain olefin unit having a $C_{3-10}$alkyl group and/or a cyclic olefin unit having a $C_{3-10}$alkyl group. The cyclic olefin polymer may be a homopolymer. In order to easily obtain desired characteristics, a preferred cyclic olefin polymer includes a copolymer of the chain olefin unit and/or the cyclic olefin unit and a copolymerizable unit, in particularly, a copolymer containing (A) a cyclic olefin unit (or a cycloolefin unit) free from a $C_{3-10}$alkyl group and (B) a chain or cyclic olefin unit having a $C_{3-10}$alkyl group.

A polymerizable component (a monomer) for forming the cyclic olefin unit (A) is a polymerizable cyclic olefin having an ethylenic double bond in a ring thereof. The monomer is classifiable into a monocyclic olefin, a bicyclic olefin, a polycyclic (tri- or more-cyclic) olefin, or others.

The monocyclic olefin may include, for example, a $C_{4-12}$cyclioolefin such as cyclobutene, cyclopentene, cycloheptene, or cyclooctene.

The bicyclic olefin may include, for example, 2-norbornene; a norbornene compound having a $C_{1-2}$alkyl group, such as 5-methyl-2-norbornene, 5,5-dimethyl-2-norbornene, or 5-ethyl-2-norbornene; a norbornene compound having an alkenyl group, such as 5-ethylidene-2-norbornene; a norbornene compound having an alkoxycarbonyl group, such as 5-methoxycarbonyl-2-norbornene or 5-methyl-5-methoxycarbonyl-2-norbornene; a norbornene compound having a cyano group, such as 5-cyano-2-norbornene; a norbornene compound having an aryl group, such as 5-phenyl-2-norbornene or 5-phenyl-5-methyl-2-norbornene; octalin; and an octalin having a $C_{1-2}$alkyl group, such as 6-ethyl-octahydronaphthalene.

The polycyclic olefin may include, for example, dicyclopentadiene; a derivative such as 2,3-dihydrodicyclopentadiene, methanooctahydrofluorene, dimethanooctahydronaphthalene, dimethanocyclopentadienonaphthalene, or methanooctahydrocyclopentadienonaphthalene; a derivative having a substituent, such as 6-ethyl-octahydronaphthalene; an adduct of cyclopentadiene and tetrahydroindene; and a trimer to tetramer of cyclopentadiene.

These cyclic olefins may be used alone or in combination. Among these cyclic olefins, in order to obtain well-balanced peelability and flexibility, the bicyclic olefin is preferred. The proportion of the bicyclic olefin (particularly, a norbornene compound) in the cyclic olefin free from a $C_{3-10}$alkyl group (the cyclic olefin for forming the cyclic olefin unit (A)) may be not less than 10% by mol, for example, not less than 30% by mol, preferably not less than 50% by mol, and more preferably not less than 80% by mol (particularly, not less than 90% by mol), or may be 100% by mol (the cyclic olefin may contain the bicyclic olefin alone). In particular, the cyclic olefin polymer containing the polycyclic (tri- or more-cyclic) olefin in a larger proportion is difficult to use in producing by a roll-to-roll processing.

Representative examples of the bicyclic olefin may include, for example, a norbornene (2-norbornene) which may have a substituent other than a $C_{3-10}$alkyl group, and an octalin (octahydronaphthalene) which may have a substituent other than a $C_{3-10}$alkyl group. As the substituent, there may be mentioned methyl group, ethyl group, an alkenyl group, an aryl group, a hydroxyl group, an alkoxy group, a carboxyl group, an alkoxycarbonyl group, an acyl group, a cyano group, an amide group, a halogen atom, or other groups. These substituents may be used alone or in combination. Among these substituents, a non-polar group, such as methyl group or ethyl group, is preferred from the perspective of prevention or elimination of loss in peelability. Among these bicyclic olefins, the norbornene compound, such as norbornene or a norbornene having a $C_{1-2}$alkyl group (in particular, norbornene), is particularly preferred.

A polymerizable component (a monomer) for forming the chain or cyclic olefin unit (B) is a polymerizable olefin which can form a $C_{3-10}$alkyl group as a side chain on a main chain of the cyclic olefin polymer and which has an ethylenic double bond. The monomer is classifiable into a chain olefin having a $C_{3-10}$alkyl group and a cyclic olefin having a $C_{3-10}$alkyl group. The chain olefin unit may be a chain olefin unit produced by ring-opening of a cyclic olefin. In order to easily control the ratio of the units (A) and (B), the chain olefin unit is preferably a unit obtainable from a chain olefin monomer.

The chain olefin having a $C_{3-10}$alkyl group may include, for example, an α-chain $C_{5-13}$olefin such as 1-pentene, 3-methyl-1-pentene, 4-methyl-1-pentene, 1-hexene, 1-octene, 1-nonene, 1-decene, 1-undecene, or 1-dodecene. These chain olefins may be used alone or in combination. Among these chain olefins, an α-chain $C_{6-12}$olefin is preferred, and an α-chain $C_{6-10}$olefin (in particular, an α-chain $C_{7-9}$olefin such as 1-octene) is more preferred.

The cyclic olefin having a $C_{3-10}$alkyl group may be a cyclic olefin having a cyclic olefin skeleton as exemplified in the paragraph of the cyclic olefin unit (A), and a $C_{3-10}$alkyl group as a substituent thereon. As the cyclic olefin skeleton, a bicyclic olefin (particularly, norbornene) is preferred. A preferred cyclic olefin having a $C_{3-10}$alkyl group may include, for example, a straight- or branched-chain $C_{3-10}$alkylnorbornene such as 5-propyl-2-norbornene, 5-butyl-2-norbornene, 5-pentyl-2-norbornene, 5-hexyl-2-norbornene, 5-octyl-2-norbornene, or 5-decyl-2-norbornene. These cyclic olefins may be used alone or in combination. Among these cyclic olefins, a straight-chain $C_{4-9}$alkylnorbornene is preferred, and a straight-chain $C_{4-8}$alkylnorbornene (in particular, a straight-chain $C_{5-7}$alkylnorbornene such as 5-hexyl-2-norbornene) is more preferred.

The ratio (molar ratio) of the cyclic olefin unit (A) relative to the chain or cyclic olefin unit (B) [the former/the latter] is, for example, about 50/50 to 99/1, preferably about 60/40 to 95/5, and more preferably about 70/30 to 90/10 (particularly about 75/25 to 90/10). A film of a cyclic olefin polymer containing an excessively low ratio of the cyclic olefin unit (A) has a reduced heat resistance, while a film of a cyclic olefin polymer containing an excessively high ratio of the cyclic olefin unit (A) tends to have a reduced toughness.

The cyclic olefin polymer may further contain a copolymerizable unit other than the cyclic olefin unit (A) and the chain or cyclic olefin unit (B). A polymerizable component (a monomer) for forming such a copolymerizable unit may include, for example, an α-chain $C_{1-4}$olefin (such as ethylene, propylene, 1-butene, or isobutene), a vinyl ester monomer (e.g., vinyl acetate and vinyl propionate), a diene monomer (e.g., butadiene and isoprene), and a (meth)acrylic monomer [e.g., (meth)acrylic acid or a derivative thereof (such as a (meth)acrylate)]. These polymerizable components may be used alone or in combination. Among them, a monomer substantially free from a unit having a polar group (such as a carboxyl group, a hydroxyl group, or an amino group) is preferred in terms of prevention or elimination of loss in peelability. As such a monomer, for example, a α-chain $C_{1-4}$olefin, such as ethylene or propylene, is widely used. The ratio of the copolymerizable unit relative to the total amount of the cyclic olefin unit (A) and the chain or cyclic olefin unit (B) is not more than 10% by mol, preferably not more than 5% by mol, and more preferably not more than 1% by mol.

The cyclic olefin polymer has a number-average molecular weight of, for example, about 10000 to 300000, preferably about 50000 to 250000, and more preferably about 80000 to 200000 (particularly about 100000 to 150000) in terms of polystyrene in a gel permeation chromatography (GPC). A cyclic olefin polymer having an excessively small molecular weight tends to have a reduced film-forming property. A cyclic olefin polymer having an excessively large molecular weight has an increased viscosity and thus tends to be less easy to handle.

The cyclic olefin polymer may be a polymer obtainable by addition polymerization or may be a polymer obtainable by ring-opening polymerization (e.g., ring-opening metathesis polymerization). The polymer obtainable by ring-opening metathesis polymerization may be a hydrogenated polymer. The cyclic olefin polymer may be obtained by a conventional polymerization method, for example, a ring-opening metathesis polymerization using a metathesis polymerization catalyst, an addition polymerization using a Ziegler catalyst, and an addition polymerization using a metallocene catalyst (usually, a ring-opening metathesis polymerization using a metathesis polymerization catalyst). For example, concrete polymerization methods are described in Japanese Patent Application Laid-Open Publication Nos. 2004-197442, 2007-119660, and 2008-255341, Macromolecules, 43, 4527 (2010), Polyhedron, 24, 1269 (2005), J. Appl. Polym. Sci, 128 (1), 216 (2013), or Polymer Journal, 43, 331 (2011). The polymerization catalyst to be used may include a conventional catalyst, for example, a catalyst synthesized by the method described in Macromolecules, 1988, vol. 31, page 3184 or Journal of Organometallic Chemistry, 2006, vol. 691, page 193.

The release layer may further contain a commonly used additive. The commonly used additive may include, for example, a filler, a lubricant (such as a wax, a fatty acid ester, or a fatty acid amide), an antistatic agent, a stabilizer (such as an antioxidant, a heat stabilizer, or a light stabilizer), a flame retardant, a viscosity modifier, a thickener, and a defoaming agent. The release layer may contain any organic or inorganic particle (in particular, an antiblocking agent such as zeolite) that has no adverse effect on the surface smoothness of the release layer.

The proportion of the cyclic olefin polymer in the release layer may be, for example, not less than 80% by weight, preferably not less than 90% by weight, and more preferably not less than 95% by weight (e.g., 95 to 100% by weight).

In particular, the present invention allows the release layer to have an improved peelability if the release layer is free from a low molecular weight releasing agent (such as a silicone compound) with which the electrolyte membrane or the electrode membrane is easily contaminated. The release layer preferably contains substantially no silicone compound.

The release layer has an average thickness of, for example, about 0.1 to 100 µm, preferably about 0.3 to 80 µm, and more preferably about 0.5 to 50 µm. In particular, in a case where the release layer is a coating film, the release layer may be thin, for example, may have a thickness of about 0.2 to 5 µm, preferably about 0.5 to 3 µm, and more preferably about 0.8 to 2 µm. The thin release layer, which is easy to handle, is suitable for a roll-to-roll processing or others and is economically efficient. For the coating film, the average thickness can be calculated based on the amount of the release layer coated (the weight of the solid contents per unit area) and the density.

(Substrate Layer)

The release film of the present invention may be any release film that contains the release layer. The release film may be a single-layer release film composed of the release layer alone (e.g., a release film formed by extrusion molding) or may be a laminated release film that has a substrate layer and the above-mentioned release layer on at least one side of the substrate layer. Among them, in the light of improved production of a fuel cell and easy formation of a release layer having a uniform thin thickness, the release film is preferably a laminated release film.

The substrate layer improves the dimensional stability of the release film in a production process of a fuel cell. In particular, the substrate layer prevents the release film from elongating if a tensile force is given to the release film by a roll-to-roll processing. Further, the substrate layer maintains a high dimensional stability and prevents the release film from separating from the electrolyte membrane or the electrode membrane, even if the release film is exposed to a high temperature by a drying step, a thermocompression treatment, or others. From such respects, the substrate layer is preferably composed of a material having a high heat resistance and a high dimensional stability. Specifically, the substrate layer may be composed of a synthetic polymer having an elastic modulus of 100 to 1000 MPa at 150° C. The elastic modulus may be, for example, about 120 to 1000 MPa, preferably about 150 to 1000 MPa, and more preferably about 200 to 1000 MPa. A substrate layer having an excessively low elastic modulus has a low dimensional stability and gives rise to separation of the release film from the electrolyte membrane or the electrode membrane in production by a roll-to-roll processing. This causes inefficient production of a fuel cell.

As the synthetic polymer, for example, there may be used various thermoplastic polymers or thermosetting polymers. The thermoplastic polymer, which has a suitable flexibility for production by a roll-to-roll processing, is preferred. The thermoplastic polymer may include, for example, a polyolefin (such as a propylene-series polymer or a cyclic polyolefin), a vinyl alcohol-series polymer, a polyester, a polyamide, a polyimide, a polycarbonate, a poly(phenylene ether), a poly(phenylene sulfide), and a cellulose derivative. These thermoplastic polymers may be used alone or in combination. Among these thermoplastic polymers, a preferred one may include at least one member selected from the group consisting of the polyolefin, the vinyl alcohol-series polymer, the polyester, the polyamide, the polyimide, and the cellulose derivative. In terms of well-balanced heat resistance and flexibility, the polyester and the polyimide are particularly preferred. As the polyester, a $C_{2-4}$alkylene arylate-series polymer such as a poly(ethylene terephthalate) (PET) or a poly(ethylene naphthalate) (PEN) may preferably be used. The polyimide may include a thermosetting polyimide (such as a pyromellitic acid-series polyimide, a bismaleimide-series polyimide, a nadic acid-series polyimide, or an acetylene terminated polyimide), a thermoplastic polyimide, a polyetherimide, a polyamideimide, or other polyimides.

The substrate layer may be composed of a stretched film in order to improve the strength of the film. The stretching may be monoaxially stretching. In order to improve the strength of the film, biaxially stretching is preferred. The stretching ratio in each of machine and crosswise directions may for example be not less than 1.5 (e.g., about 1.5 to 6), or is preferably about 2 to 5 and more preferably about 3 to 4. In a case where the stretching ratio is too low, the strength of the film tends to be insufficient.

The substrate layer has an average thickness of, for example, about 1 to 300 µm, preferably about 5 to 200 and more preferably about 10 to 100 µm (particularly about 20 to 80 µm). A substrate layer having an excessively large thickness makes it difficult to produce the release film by a roll-to-roll processing. A substrate layer having an excessively small thickness has a low dimensional stability.

The thickness ratio of the release layer relative to the substrate layer [the release layer/the substrate layer] is, for example, about 1/1 to 1/500, preferably about 1/5 to 1/300, and more preferably about 1/10 to 1/200 (particularly about 1/30 to 1/100).

The surface of the substrate layer may be subjected to a conventional surface treatment or easy-adhesion treatment in order to improve the adhesion to the release layer.

(Process for Producing Release Film)

As the process for producing the release film, a conventional process may be used. For a release film composed of the release layer alone, for example, the release film may be formed by extrusion molding or coating. For a release film having a lamination structure of the release layer and the substrate layer, the release film may be produced by, for example, coating, coextrusion or extrusion lamination, thermocompression, or other processes. The release layer and the substrate layer may be laminated through an agglutinant or an adhesive.

Among them, in order to easily form a thin and surface-smooth release layer, a preferred process comprises coating (or casting) a solution containing cyclic olefin polymer on the substrate layer and then drying the coated solution. The coating method may include a conventional manner, for example, a roll coater, an air knife coater, a blade coater, a rod coater, a reverse coater, a bar coater, a comma coater, a die coater, a gravure coater, a screen coater, a spraying method, and a spinner method. Among these methods, the blade coater, the bar coater, or the gravure coater is widely used.

As the solvent, a nonpolar solvent may be used. For example, the solvent may include an aliphatic hydrocarbon (such as hexane), an alicyclic hydrocarbon (such as cyclohexane), an aromatic hydrocarbon (such as toluene or xylene), and an aromatic oil (such as solvent naphtha). These solvents may be used alone or in combination. Among them, a preferred one may include the aromatic hydrocarbon such as toluene, the aromatic oil such as solvent naphtha, or other solvents.

The solid content of the solution may for example be about 0.1 to 50% by weight, preferably about 0.3 to 30% by weight, and more preferably about 0.5 to 20% by weight (particularly about 0.8 to 15% by weight).

The drying may be air drying. The solvent may be evaporated by heat drying. The drying temperature may be not lower than 50° C., and is, for example, about 50 to 200° C., preferably about 60 to 150° C., and more preferably about 80 to 120° C.

[Laminate]

The laminate of the present invention is a laminate for producing a polymer electrolyte fuel cell. The laminate comprises a release film and an ion exchange layer (an electrolyte membrane, an electrode membrane, a membrane electrode assembly); the release film comprises a release layer, and the ion exchange layer contains an ion exchange polymer and is laminated on the release layer.

As the ion exchange polymer, a conventional ion exchange polymer utilized for a fuel cell can be used. In particular, a cation exchange polymer such as a strongly acidic cation exchange polymer or a slightly acidic cation exchange polymer is preferred. The cation exchange polymer may include, for example, an ion exchange polymer having a sulfonic acid group, a carboxyl group, a phosphoric acid group, a phosphonic acid group, or other groups (specifically, an ion exchange polymer having, as an electrolytic group having an electrolytic function, a sulfonic acid group, a carboxyl group, a phosphoric acid group, a phosphonic acid group, or other groups). A particularly preferred one includes an ion exchange polymer having a sulfonic acid group (an ion exchange polymer having a sulfonic acid group as an electrolytic group).

As the ion exchange polymer having the sulfonic acid group, there may be used various polymers, each having a sulfonic acid group. Such a polymer may include, for example, a polyolefin (such as a polyethylene or a polypropylene), a (meth)acrylic polymer, a styrenic polymer, a polyacetal, a polyester, a polycarbonate, a polyamide, a polyamideimide, a polyimide, a polyether, a polyetherimide, a polyetherketone, a polyetheretherketone, a polysulfone, a polyethersulfone, a poly(phenylene sulfide), and a fluoropolymer.

Among the ion exchange polymers having sulfonic acid group, a preferred one may include a fluoropolymer having a sulfonic acid group, a sulfonated product of a crosslinked polystyrene, or other polymers. The polymer may be a polystyrene-graft-ethylenetetrafluoroethylene copolymer having a sulfonic acid group, a polystyrene-graft-polytetrafluoroethylene copolymer having a sulfonic acid group, or other polymers. Among them, in terms of releasability or others, a fluoropolymer (e.g., a fluorohydrocarbon polymer in which at least some hydrogen atoms are replaced with fluorine atoms) having a sulfonic acid group is particularly preferred. In particular, for the polymer electrolyte fuel cell, a preferred one may include a fluoropolymer containing a side chain having a sulfonic acid group (or —$CF_2CF_2SO_3H$ group), for example, a copolymer (e.g., a block copolymer) of [2-(2-sulfotetrafluoroethoxy)hexafluoropropoxy]trifluoroethylene and tetrafluoroethylene, or other polymers.

The ion exchange polymer may have anion exchange capacity of not less than 0.1 meq/g, for example, about 0.1 to 2.0 meq/g, preferably about 0.2 to 1.8 meq/g, and more preferably about 0.3 to 1.5 meq/g (particularly about 0.5 to 1.5 meq/g).

As such an ion exchange polymer, "registered trademark: Nafion" manufactured by DuPont or other commercially available products may be used. As the ion exchange polymer, there may be used an ion exchange polymer described in Japanese Patent Application Laid-Open Publication No. 2010-234570, or other polymers.

The ion exchange layer may be an electrolyte membrane composed of the ion exchange polymer, or an electrode membrane containing the ion exchange polymer and a catalyst particle.

In the electrode membrane (catalyst layer or catalyst membrane), the catalyst particle contains a metallic component having a catalytic action (in particular, a noble metal simple substance such as platinum (Pt), or an alloy containing a noble metal such as platinum (Pt)). Typically, in an electrode membrane for a cathode, the catalyst particle contains platinum, and in an electrode membrane for an anode, the catalyst particle contains a platinum-ruthenium alloy. The catalyst particle is typically used as a composite particle having the metallic component supported on a conductive material (e.g., a carbon material such as carbon black). For the electrode membrane, the ratio of the ion exchange polymer relative to 100 parts by weight of the catalyst particle is, for example, about 5 to 300 parts by weight, preferably about 10 to 250 parts by weight, and more preferably about 20 to 200 parts by weight.

The ion exchange layer may also contain a commonly used additive as exemplified in the paragraph of the release layer. For example, the ion exchange layer may contain an inorganic material such as an inorganic particle or an inorganic fiber (e.g., a carbonaceous material, a glass, and a ceramics).

The ion exchange layer is disposed (or formed) on at least one side of the release layer. The ion exchange layer may be disposed (or formed) on both sides of the release layer or may be formed on one side of the release layer.

The ion exchange layer has an average thickness of, for example, about 1 to 500 μm, preferably about 1.5 to 300 μm, and more preferably about 2 to 200 μm.

The electrolyte membrane has an average thickness of, for example, about 1 to 500 μm, preferably about 5 to 300 μm, and more preferably about 10 to 200 μm.

The electrode membrane has an average thickness of, for example, about 1 to 100 μm, preferably about 2 to 80 μm, and more preferably about 2 to 50 μm.

[Process for Producing Laminate and Membrane Electrode Assembly]

The process for producing the laminate of the present invention comprises a step of laminating an ion exchange layer containing an ion exchange polymer on a release layer of a release film (at least one side of a release layer).

For the laminating step, the ion exchange layer (an electrolyte membrane containing an ion exchange polymer and/or an electrode membrane containing an ion exchange polymer) is formed on the release layer of the release film by coating. For example, an electrolyte membrane may be laminated on a first release film by coating to give a laminate having the electrolyte membrane laminated on the release film, and an electrode membrane may be laminated on a second release film by coating to give a laminate having the electrode membrane laminated on the release film.

In order to form the electrolyte membrane and the electrode membrane by coating (or casting), the electrolyte membrane and the electrode membrane are coated in the state of a solution containing an ion exchange polymer (and a catalyst particle) dissolved in a solvent.

The solvent may include, for example, water, an alcohol (e.g., a $C_{1-4}$alkanol such as methanol, ethanol, isopropanol, or 1-butanol), a ketone (such as acetone or methyl ethyl ketone), an ether (such as dioxane or tetrahydrofuran), and a sulfoxide (such as dimethylsulfoxide). These solvents may be used alone or in combination. Among these solvents, in terms of easy handling or other characteristics, water or a mixed solvent containing water and a $C_{1-4}$alkanol is widely used. The solution has a concentration of a solute (an ion exchange polymer, a catalyst particle) of, for example, about 1 to 80% by weight, preferably about 2 to 60% by weight, and more preferably about 3 to 50% by weight.

The coating method may include a conventional manner as exemplified in the paragraph of the process for producing the release film. Among these methods, the blade coater, the bar coater, or other methods are widely used.

After the solution containing the ion exchange polymer (and the catalyst particle) is coated, the solvent may be evaporated by heat drying. The drying temperature may be not lower than 50° C. For the electrolyte membrane, for example, the drying temperature is about 80 to 200° C. (particularly about 100 to 150° C.). For the electrode membrane, for example, the drying temperature is about 50 to 150° C. (particularly about 60 to 120° C.).

The laminate obtained in the laminating step is usually subjected to a bonding (or closely contacting) step. For a continuous production, before the bonding step, the laminate is transported to a place where the bonding step is carried out.

According to the present invention, the release film has an excellent flexibility, and thus the laminating step with such a transport can be carried out by a roll-to-roll processing, achieving improved production of the release film. Further, combination of the release layer and the substrate layer gives an excellent dimensional stability to the release film and thus prevents the release film from elongating if a tensile force is applied by a roll-to-roll processing. This allows the release film to be rolled up without separation of the ion exchange layer, achieving improved production.

The laminate obtained in the laminating step may be subjected to the bonding step. In the bonding step, an electrolyte membrane laminated on a release layer of a first release film is bonded to an electrode membrane laminated on a release layer of a second release film to prepare a membrane electrode assembly.

The electrolyte membrane and the electrode membrane are usually bonded by thermocompression. The heating temperature is, for example, about 80 to 250° C., preferably about 90 to 230° C., and more preferably about 100 to 200° C. The pressure is, for example, about 0.1 to 20 MPa, preferably about 0.2 to 15 MPa, and more preferably about 0.3 to 10 MPa.

The composite obtained in the bonding step (a laminate of the electrolyte membrane and the electrode membrane bonded to each other) is subjected to a step for separating the release films from the ion exchange layers (the electrolyte membrane and/or the electrode membrane) to give a membrane electrode assembly for a polymer electrolyte fuel cell. According to the present invention, the laminate passed through the above-mentioned drying step or thermocompression step has a moderate peel strength. Thus the release film is not separated from the ion exchange layer in the laminating step or the bonding step, while the release film is easily separable in the separating step. This improves handleability in obtaining the laminate.

The release layer of the release film has a given releasability to the ion exchange layer. The peel strength between the release layer of the release film and the ion exchange layer (in particular, the peel strength of the laminate in the separating step) is, for example, about 0.1 to 20 mN/mm, preferably about 0.5 to 18 mN/mm, and more preferably about 1 to 15 mN/mm (particularly about 2 to 12 mN/mm). In a case where the peel strength is too large, it is difficult to separate the release layer from the ion exchange layer. In a case where the peel strength is too small, the handleability in the laminating step and bonding step is low.

As used herein, the peel strength can be measured by allowing the release film bonded to the ion exchange layer to stand at 20° C. and 50% RH for one hour or more and then subjecting the release film to 180° separation (or peeling) under a condition of 300 mm/minute.

Further, in the same manner as the bonding step and the separating step, an electrode membrane of a laminate having the electrode membrane laminated on a release layer of a third release film (wherein the electrode membrane is an electrode membrane for a cathode in a case where the second release film is used for an electrode membrane for an anode) is bonded to the electrolyte membrane separated from the first release film, and the third release film is separated. A fuel gas supply layer and an air supply layer are laminated on the corresponding electrode membranes by a conventional method to give a membrane electrode assembly (MEA).

EXAMPLES

The following examples are intended to describe this invention in further detail and should by no means be interpreted as defining the scope of the invention. The release films obtained in Examples and Comparative Examples were evaluated for the characteristics according to the following methods.

[Glass Transition Temperature]

The glass transition temperature was measured under a nitrogen flow at a heating rate of 10° C./minute by a differential scanning calorimeter ("DSC6200" manufactured by SII NanoTechnology Inc.) in accordance with Japanese Industrial Standards (JIS) K7121.

[Measurement of Viscoelasticity]

A film having a thickness of 50 to 100 µm was produced by a hot-press method or a solution casting method and cut to a width of 5 mm and a length of 50 mm to give a test piece. The dynamic storage modulus (E') of the test piece was measured from −100° C. to 250° C. using a dynamic viscoelasticity measuring apparatus (RSA-III manufactured by TA Instruments Japan Inc.) under the following conditions: a chuck distance of 20 mm, a heating rate of 5° C./minute, and an angular frequency of 10 Hz.

[Composition Ratio of Cyclic Olefin Polymer]

The composition ratio of a cyclic olefin polymer (copolymer) was measured by $^{13}$C-NMR.

[Solubility]

One part by weight of a cyclic olefin polymer composed of a release film was added to 9 parts by weight of toluene, and the mixture was stirred. The dissolution state of the polymer was visually observed at a room temperature and evaluated on the basis of the following criteria.

A: The polymer is dissolved immediately.
B: It takes a time to dissolve the polymer.
C: The polymer is not dissolved.

[Releasability of Electrode Membrane]

An easily adhesive biaxially stretched polyester film ("COSMOSHINE A4100" manufactured by TOYOBO CO., LTD., 50 µm thick) and an ion exchange polymer dispersion ("Nafion (registered trademark) DE2020CS" manufactured by DuPont, a water-alcohol dispersion of an ion exchange polymer, solid content: 20% by weight) were provided. The ion exchange polymer dispersion was cast on an easily adhesive layer surface of the polyester film using a doctor blade to give a coat, and the coated film were dried in an oven at 130° C. to form a laminate containing an ion exchange layer (20 μm thick) as an electrolyte membrane.

The electrolyte membrane of the resulting laminate was pressed onto the electrode membrane of each one of laminates obtained in Examples and Comparative Examples at a temperature shown in Table 1 and a pressure of 10 MPa. The substrate film on the electrode membrane was separated from the electrode membrane, and the releasability was evaluated on the basis of the following criteria.

A . . . No electrode membrane remains on the release layer.

B . . . The electrode membrane slightly remains on the release layer.

C . . . The electrode membrane remains on the release layer.

[Toughness]

A release film was set to a roller and sent out at a rate of 0.3 m/minute, and coated with the liquid coating composition for the electrode membrane used in Examples at a coating amount containing a Pt weight of 0.5 mg/cm$^2$ by a roll-to-roll processing. The toughness was evaluated on the basis of the following criteria.

A: The release layer has no fracture or crack and is coated without problems.

B: The release layer fractures and fails to be coated.

Synthesis Example 1

An atmosphere in a dried 300-mL two-neck flask was replaced with a nitrogen gas. Then, to the flask were added 8.1 mg of dimethylanilinium tetrakis(pentafluorophenyl) borate, 235.7 mL of toluene, 7.0 mL of a 7.5 mol/L solution of norbornene in toluene, 5.7 mL of 1-octene, and 2 mL of triisobutylaluminum. The reaction solution was maintained at 25° C. Separately from this solution, 92.9 mg of (t-butylamide)dimethyl-9-fluorenyl silane titanium dimethyl [(t-BuNSiMe$_2$Flu)TiMe$_2$] as a catalyst was introduced into a flask in a glove box, and the catalyst was dissolved in 5 mL of toluene. The resulting catalyst solution (2 mL) was introduced into the 300-mL flask for initiation of polymerization. After 2 minutes, 2 mL of methanol was added to the solution to complete the reaction. Thereafter, the resulting reaction mixture was added to a large amount of methanol acidified with hydrochloric acid to form a precipitate. The precipitate was separated by filtration, washed, and dried to give a 2-norbornene.1-octene copolymer A (5.0 g). The resulting copolymer A had a number-average molecular weight Mn of 30,000, a glass transition temperature Tg of 215° C., a transition point of a dynamic storage modulus (E') around −20° C., and a composition (molar ratio) of 2-norbornene and 1-octene (the former/the latter) of 70/30.

Synthesis Example 2

A 2-norbornene.1-octene copolymer B (5.0 g) was obtained in the same manner as Synthesis Example 1 except that the amount of 1-octene was 3.3 mL. The resulting copolymer B had a Mn of 121,000, a Tg of 269° C., a transition point of a dynamic storage modulus (E') around −20° C., and a composition (molar ratio) of 2-norbornene and 1-octene (the former/the latter) of 83/17.

Synthesis Example 3

A 2-norbornene.1-octene copolymer C (4.6 g) was obtained in the same manner as Synthesis Example 1 except that the amount of 1-octene was 1.7 mL. The resulting copolymer C had a Mn of 123,000, a Tg of 325° C., a transition point of a dynamic storage modulus (E') around −20° C., and a composition (molar ratio) of 2-norbornene and 1-octene (the former/the latter) of 94/6.

Synthesis Example 4

To a dried glass reactor were added 199.3 g of toluene, 33.9 g of 2-norbornene, 15.4 g of 5-hexyl-2-norbornene, and 3.1 g of MMAO-3A (Modified methyl aluminoxane type 3, manufactured by Tosoh Finechem Corporation, concentration: 2.23 mol/L). Then, 0.0074 g (20 μmol) of (t-butylamide)dimethyl-9-fluorenyl silane titanium dimethyl dissolved in 0.87 g of toluene was added to the reactor. The mixture was stirred at 40° C. for 7 hours for continuous polymerization. Then, 3 g of methanol was added to the mixture to complete the reaction. Thereafter, the polymerization reaction mixture was added to a large amount of methanol acidified with hydrochloric acid to completely precipitate a polymer. The polymer was separated by filtration, washed, and then dried under a reduced pressure at 70° C. for 3 hours or more to give a 2-norbornene.5-hexyl-2-norbornene copolymer D (21.3 g). The resulting copolymer D had a Mn of 175,000, a Tg of 331° C., a transition point of a dynamic storage modulus (E') around −20° C., and a composition (molar ratio) of 2-norbornene and 5-hexyl-2-norbornene (the former/the latter) of 79/21.

Synthesis Example 5

To a dried glass reactor were added 646.1 mL of toluene, 117.5 g of 2-norbornene, 114.7 mL of 1-hexene, and 7.0 mL of MAO-3A (Modified methyl aluminoxane type 3, manufactured by Tosoh Finechem Corporation, concentration: 2.23 mol/L). Then, 0.0074 g of (t-butylamide)dimethyl-9-fluorenyl silane titanium dimethyl dissolved in 2.6 mL of toluene was added to the reactor. The mixture was stirred at 40° C. for 3 hours for continuous polymerization. Then, 3 g of methanol was added to the mixture to complete the reaction. Thereafter, the polymerization reaction mixture was added to a large amount of methanol acidified with hydrochloric acid to completely precipitate a polymer. The polymer was separated by filtration, washed, and then dried under a reduced pressure at 70° C. for 3 hours or more to give a 2-norbornene.1-hexene copolymer E (8.7 g). The resulting copolymer E had a number-average molecular weight Mn of 32,000, a glass transition temperature Tg of 300° C., a transition point of a dynamic storage modulus (E') around −20° C., and a composition (molar ratio) of 2-norbornene and 1-hexene (the former/the latter) of 88/12.

Synthesis Example 6

A 2-norbornene.1-decene copolymer F (8.5 g) was obtained in the same manner as Synthesis Example 5 except that 174.7 mL of 1-decene was used instead of 1-hexene. The resulting copolymer F had a number-average molecular weight Mn of 27,000, a glass transition temperature Tg of 244° C., a transition point of a dynamic storage modulus (E') around −20° C., and a composition (molar ratio) of 2-norbornene and 1-decene (the former/the latter) of 85/15.

Synthesis Example 7

As a metallocene compound, (t-BuNSiMe$_2$Flu)TiMe$_2$ was prepared based on the description of "Macromolecules, 1998, vol. 31, page 3184", and the compound was recrystallized from hexane at −20° C. for purification. A dried aluminoxane was prepared based on the description of "Macromolecules, 2001, vol. 34, page 3142".

A magnetic stirrer was put in a 100-mL glass reactor with a ground-in glass stopper, and an atmosphere in the reactor was fully replaced with a nitrogen gas. To the reactor, 0.464 g of the prepared dried aluminoxane was added, and then a solution of a given amount of 2-norbornene in toluene (concentration: 5.14 mol/L) was added. The resulting solution was diluted with toluene until the total volume was 29 mL, and the concentration of 2-norbornene was adjusted to 1.5 mol/L. The solution was maintained to a polymerization temperature in an oil bath, the system was degassed under a reduced pressure several times. Then one atmosphere of ethylene was introduced into the solution to saturate the solution. A toluene solution (1 mL) of the prepared metallocene compound (concentration: 0.02 mol/L) was added to the reactor for initiation of polymerization. After the polymerization was carried out for a predetermined time, methanol acidified with hydrochloric acid (hydrochloric acid-added methanol) was added to stop the polymerization. During the polymerization, the resulting solution was maintained at a predetermined temperature. The resulting polymer was precipitated in methanol acidified with hydrochloric acid, fully washed with methanol, and dried under a reduced pressure at 60° C. for 6 hours to give a 2-norbornene.ethylene copolymer G (1.1 g). The resulting copolymer G had a Mn of 30,000, a Tg of 207° C., and a composition (molar ratio) of 2-norbornene and ethylene (the former/the latter) of 94/6. For the dynamic storage modulus (E'), no transition point from −50 to 100° C. was observed.

Synthesis Example 8

A 2-norbornene.ethylene copolymer H (0.9 g) was obtained in the same manner as Synthesis Example 7 except that the concentration of 2-norbornene was 1.9 mol/L. The resulting copolymer H had a Mn of 55,000, a Tg of 212° C., and a composition (molar ratio) of 2-norbornene and ethylene (the former/the latter) of 95/5. For the dynamic storage modulus (E'), no transition point from −50 to 100° C. was observed.

Production Example 1 of Release Film

In 9 parts by weight of toluene, 1 part by weight of the 2-norbornene.1-octene copolymer A was dissolved to prepare a liquid coating composition. As a substrate film, an easily adhesive biaxially stretched polyester film ("COSMOSHINE A4100") was provided. The liquid coating composition was applied on one side of the substrate film by Meyer bar coating and dried at a temperature of 100° C. for one minute to form a release layer (dry thickness: 1 μm), and thus a release film 1 was obtained.

Production Example 2 of Release Film

A release film 2 (dry thickness of release layer: 1 μm) was obtained in the same manner as Production Example 1 except that 1 part by weight of the 2-norbornene.1-octene copolymer B was dissolved in 99 parts by weight of toluene.

Production Example 3 of Release Film

A release film 3 (dry thickness of release layer: 1 μm) was obtained in the same manner as Production Example 1 except that 1 part by weight of the 2-norbornene.1-octene copolymer C was dissolved in 99 parts by weight of toluene.

Production Example 4 of Release Film

A release film 4 (dry thickness of release layer: 1 μm) was obtained in the same manner as Production Example 1 except that 1 part by weight of the 2-norbornene.5-hexyl-2-norbornene copolymer D was dissolved in 99 parts by weight of toluene.

Production Example 5 of Release Film

A release film 5 (dry thickness of release layer: 1 μm) was obtained in the same manner as Production Example 1 except that the 2-norbornene.1-hexene copolymer E was used instead of the 2-norbornene.1-octene copolymer A.

Production Example 6 of Release Film

A release film 6 (dry thickness of release layer: 1 μm) was obtained in the same manner as Production Example 1 except that the 2-norbornene.1-decene copolymer F was used instead of the 2-norbornene.1-octene copolymer A.

Production Example 7 of Release Film

A release film 7 (dry thickness of release layer: 1 μm) was obtained in the same manner as Production Example 1 except that a 2-norbornene.ethylene copolymer ("TOPAS (registered trademark) 6017S-04" manufactured by Topas Advanced Polymers, GmbH, Tg: 178° C.) was used instead of the 2-norbornene.1-octene copolymer A.

Production Example 8 of Release Film

A release film 8 (dry thickness of release layer: 1 μm) was obtained in the same manner as Production Example 1 except that the 2-norbornene.ethylene copolymer G was used instead of the 2-norbornene.1-octene copolymer A.

Production Example 9 of Release Film

The 2-norbornene.ethylene copolymer H instead of the 2-norbornene.1-octene copolymer A was tried to be dissolved in toluene, but the copolymer was not dissolved. Thus a release film could not be produced.

Example 1

A platinum (Pt) on carbon ("TEC10E50E" manufactured by TANAKA KIKINZOKU KOGYO K.K., 7 parts by weight) and the ion exchange polymer dispersion (Nafion DE2020CS, 35 parts by weight) were mixed by a ball mill to give a liquid coating composition for an electrode membrane (an electrode catalyst layer). The liquid coating composition was applied on the release layer of the release film 1 by a doctor blade and then dried at 100° C. for 10 minutes to give a laminate containing an electrode membrane with a Pt weight of 0.5 mg/cm$^2$.

Examples 2 to 6 and Comparative Examples 1 to 2

A laminate was obtained in the same manner as Example 1 except that each one of the release films 2 to 8 was used instead of the release film 1.

The laminates obtained in Examples and Comparative Examples were evaluated, and the results are shown in Table 1.

TABLE 1

|  | Examples | | | | | | Comparative Examples | |
| --- | --- | --- | --- | --- | --- | --- | --- | --- |
|  | 1 | 2 | 3 | 4 | 5 | 6 | 1 | 2 |
| Release film | 1 | 2 | 3 | 4 | 5 | 6 | 7 | 8 |
| Solubility | A | A | A | A | A | A | A | B |
| Toughness | A | A | A | A | A | A | A | B |
| Releasability of electrode membrane (175° C.) | A | A | A | A | A | A | B | A |
| Releasability of electrode membrane (185° C.) | B | A | A | A | A | A | C | B |
| Releasability of electrode membrane (195° C.) | B | A | A | A | B | A | C | C |

As apparent from the results shown in Table 1, the release films obtained in Examples have excellent toughness and releasability. A larger difference between the glass transition temperature and the processing temperature tends to show a higher releasability. Examples 2 to 4 and 6 show an excellent releasability.

In contrast, the release film obtained in Comparative Example 1, which has a low heat resistance, tends to show an unsuitable releasability in a production process of a fuel cell. This can reduce the yield. The release film obtained in Comparative Example 2, which has a low toughness, tends to show an unsuitable releasability from the ion exchange layer due to fracture or crack in the release layer of the release film during a production process by a roll-to-roll processing. This can reduce the yield.

INDUSTRIAL APPLICABILITY

The release film of the present invention is used for producing a membrane electrode assembly of a polymer electrolyte fuel cell.

The invention claimed is:

1. A release film for producing a membrane electrode assembly of a polymer electrolyte fuel cell, wherein the release film comprises
a release layer, the release layer having a glass transition temperature of 210 to 350° C. and comprising a copolymer which comprises, as a repeating unit, (A) an olefin unit free from a $C_{3-10}$alkyl group and (B) a chain or cyclic olefin unit having a $C_{4-8}$alkyl group, wherein a molar ratio of the cyclic olefin unit (A) relative to the chain or cyclic olefin unit (B) is 50:50 to 99:1.

2. The release film according to claim 1, wherein the release layer has a transition point of a dynamic storage modulus E' in a range from −50 to 100° C.

3. The release film according to claim 1, wherein the chain or cyclic olefin unit (B) comprises an ethylene or norbornene unit having a straight-chain $C_{4-8}$alkyl group.

4. The release film according to claim 1, wherein the molar ratio of the cyclic olefin unit (A) relative to the chain or cyclic olefin unit (B) is 70:25 to 90:10.

5. The release film according to claim 1, wherein the release layer has an average thickness of 0.2 to 5 μm.

6. The release film according to claim 1, which further comprises a substrate layer, wherein the release layer is laminated on at least one side of the substrate layer, and the substrate layer comprises at least one member selected from the group consisting of a polyolefin, a vinyl alcohol-series polymer, a polyester, a polyamide, and a cellulose derivative.

7. The release film according to claim 1, wherein the release layer is formed by coating.

8. A laminate for producing a polymer electrolyte fuel cell, wherein the laminate comprises a release film recited in claim 1 and an ion exchange layer laminated on a release layer of the release film, and the ion exchange layer comprises an ion exchange polymer.

9. The laminate according to claim 8, wherein the ion exchange polymer comprises a fluoropolymer comprising a side chain having a sulfonic acid group, and the ion exchange layer comprising the ion exchange polymer is an electrolyte membrane, an electrode membrane, or both.

10. The laminate according to claim 8, which is produced by a roll-to-roll processing.

11. A process for producing a laminate recited in claim 8, comprising: a step of laminating an ion exchange layer comprising an ion exchange polymer on a release layer of a release film.

12. The process according to claim 11, wherein, in the laminating step, the lamination is carried out by a roll-to-roll processing.

13. A process for producing a membrane electrode assembly of a polymer electrolyte fuel cell, comprising: a step of separating a release film from a laminate recited in claim 8.

* * * * *